United States Patent [19]
Pecoraro

[11] 3,829,989
[45] Aug. 20, 1974

[54] EDUCATIONAL CLOCK TOY
[76] Inventor: Anthony Pecoraro, 1041 Pleasant St., Oak Park, Ill. 60302
[22] Filed: Jan. 10, 1973
[21] Appl. No.: 322,367

[52] U.S. Cl. .................................. 35/39, 35/9 B
[51] Int. Cl. ........................................ G09b 19/12
[58] Field of Search ................... 35/9 R, 9 B, 39

[56] References Cited
UNITED STATES PATENTS

| | | | |
|---|---|---|---|
| 2,539,077 | 1/1951 | Hawkins | 35/39 UX |
| 2,855,703 | 10/1958 | Stanton | 35/9 R X |
| 3,295,312 | 1/1967 | Nutting et al. | 35/39 X |
| 3,362,103 | 1/1968 | Neumann | 35/39 X |
| 3,546,791 | 12/1970 | Koos et al. | 35/9 B |

Primary Examiner—Wm. H. Grieb
Attorney, Agent, or Firm—Hill, Gross, Simpson, Van Santen, Steadman, Chiara & Simpson

[57] ABSTRACT

An educational toy has a housing provided with a plurality of outwardly opening apertures each of which has associated therewith a prominent character. Reward means are positioned within the housing and dispensable through a predetermined one or more of the apertures, so that when selector means adapted for selectively identifying any one of the characters by orientation therewith are properly oriented with the character associated with the predetermined aperture or apertures, means for dispensing the reward means will operate to dispense the reward. Teaching children to tell time is thus facilitated on a simulated clock. Success annunciator means may also be provided.

19 Claims, 9 Drawing Figures

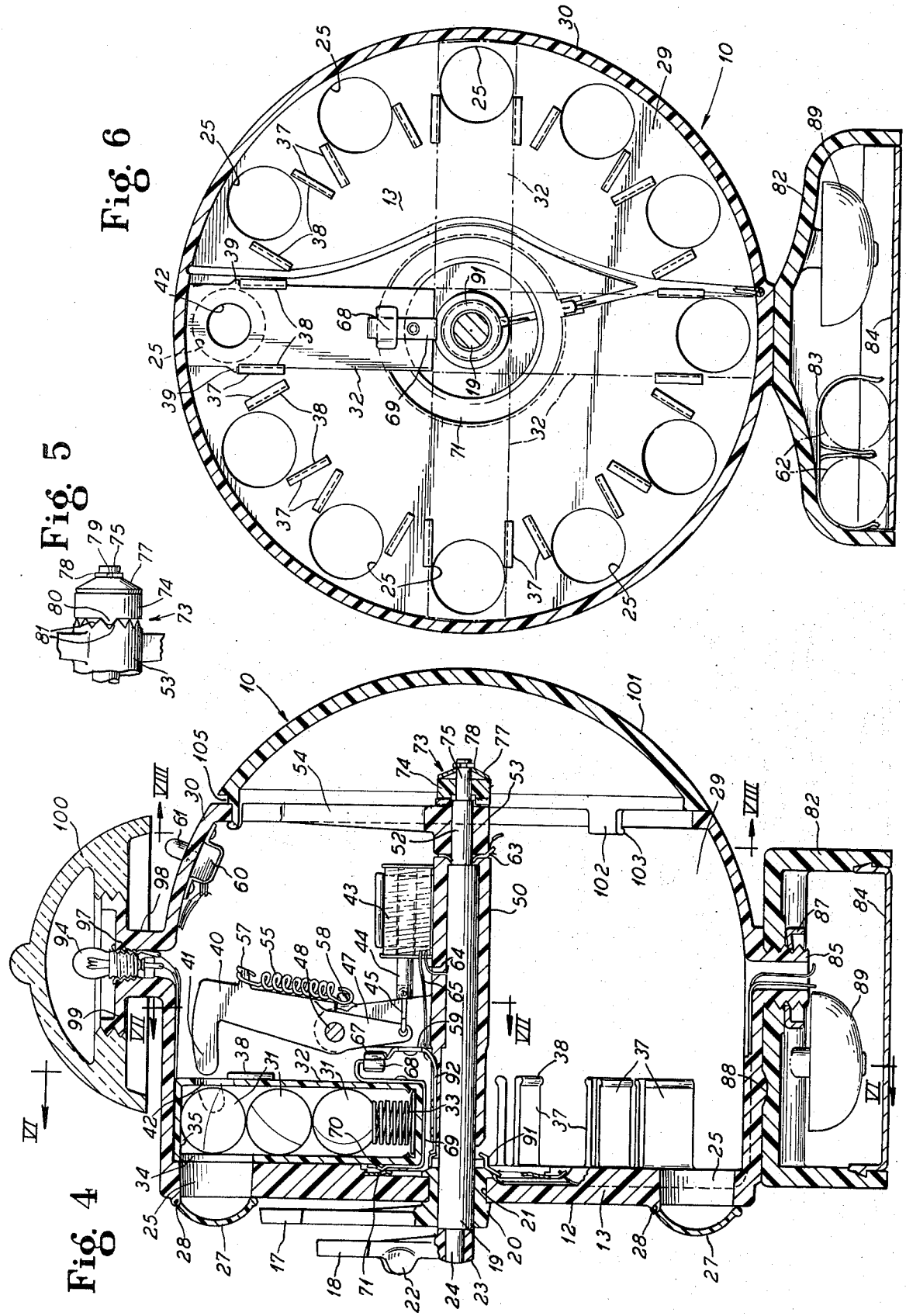

EDUCATIONAL CLOCK TOY

This invention relates to educational toys and is more particularly concerned with toys of the multiple choice or selection type providing for a reward when a proper selection has been made.

Educational toys especially adapted for teaching pre-school children provide for visual identification and manipulation, but rarely provide for any sort of article of reward which will accrue by making a proper choice or selection where newly acquired knowledge is tested. This is especially true in respect to devices for teaching pre-school children to tell time.

Accordingly, it is an important object of the present invention to provide a new and improved educational toy which will provide a tangible reward for proper choice or selection.

Another object of the invention is to provide a new and improved educational toy especially suitable for teaching the telling of time, i.e., reading time by observing the face of a clock and the orientation of the hands of the clock with the hour positions.

A further object of the invention is to provide a new and improved educational toy adapted to be preloaded with tangible reward means to be dispensed from the device upon the making of a proper choice or selection by one who is not informed of the actual location of the dispensable reward.

Still another object of the invention is to provide a new and improved educational toy having novel means for rewarding a proper response from an individual in a learning process.

Yet another object of the invention is to provide a new and improved educational clock device.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 4 is a vertical sectional view taken substantially along the line IV—IV of FIG. 1.

FIG. 5 is a fragmentary elevational view showing the click detent mechanism, also shown in FIG. 4.

FIG. 6 is a sectional detail view taken substantially along the line VI—VI of FIG. 4.

As shown in FIG. 1, an educational toy embodying features of the invention comprises a simulated clock having a form and arrangement which will make it especially attractive to young children in the process of learning to tell time. To this end, the device is provide with a housing 11 which may be constructed from any suitable material in the form of a shell suitably dimensioned to provide a wide, open clock face 12 on the front of the housing, desirably comprising a front panel 13 (FIG. 4) of the housing. To acquaint the child with the fact that the front of a clock is referred to as the face of the clock, the face may be provided with suitable decoration 14 generally simulative of a fanciful face. At the customary time intervals, the face 12 carries suitable hourly indicia desirably in the form of prominent numerals 15. In addition, the face 12 has associated therewith a prominent minute hand 17 and an hour hand 18 both of which radiate from a center provided by a shaft 19. In this instance, the minute hand 17 is directed toward the normal twelve o'clock position and may be permanently fixed, although it may be selectively swingably shiftable to another position if preferred. By way of example, the minute hand 17 may be integrally molded into one piece from suitable rigid plastic material and provided with a hub bushing 20 secured within a center aperture 21 in the face panel 13 and provides a bearing for a journal portion of the shaft 19 which extends therethrough to the interior of the housing 11. For convenience in swinging the hour hand 18 about the axis of the shaft 19, a suitable handle 22 is provided on the hour hand 18, desirably in the form of a vane or wing-like lug projecting from the outer face of the hand. In a preferred construction, the hand 18 is molded from suitable rigid plastic and is provided with a hub 23 secured in keyed co-rotational relation on a flatted terminal portion 24 of the shaft 19. Through this arrangement, the hand 18 can be turned to orient it with any one of the numerals 15. In one aspect, this may be done to show identification of a particular number in response to an auditory request to the learner or by way of matching of a flashcard number or any other number to which attention may be directed, as on a blackboard, or the like. On the other hand, for teaching telling of time, auditory or visual command, request or suggestion may be given, and the learner then turns the handle 18 to orient it with the number to be identified according to the learner's comprehension in response to the oral or visual direction or suggestion given.

Figure 1:
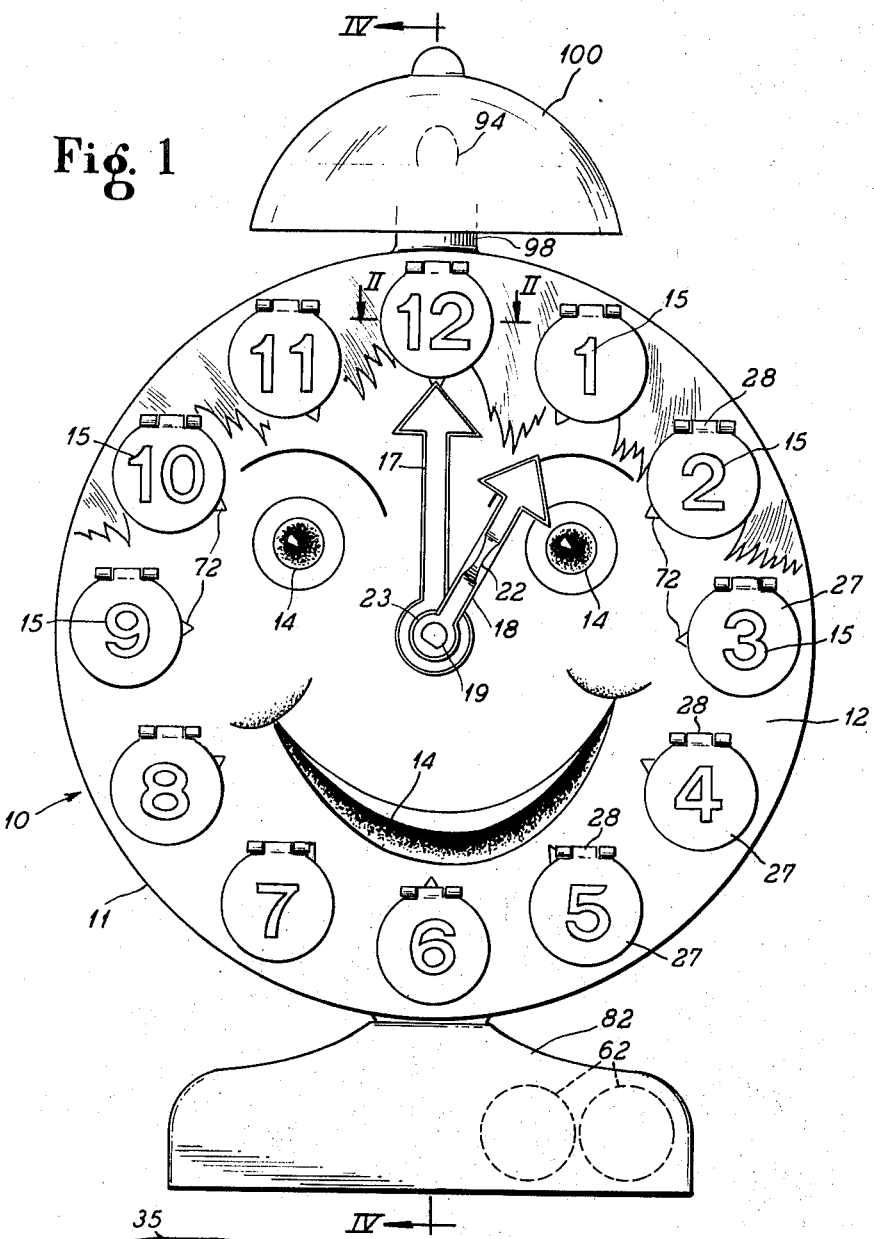
FIG. 1 is a front elevational view of a device according to the present invention in the form of a simulated clock.
Figure 3:
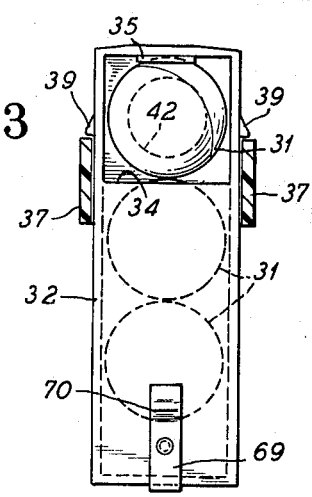
FIG. 3 is a fragmentary sectional elevational detail view taken substantially along the line III—III of FIG. 2.
Figure 2:
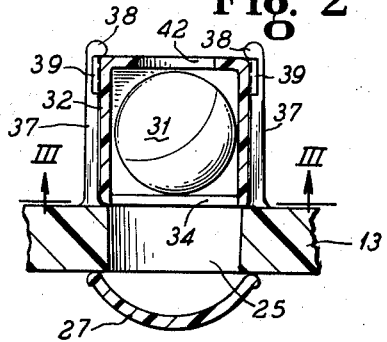
FIG. 2 is an enlarged fragmentary sectional detail view taken substantially along the line II—II of FIG. 1.
Figure 7:
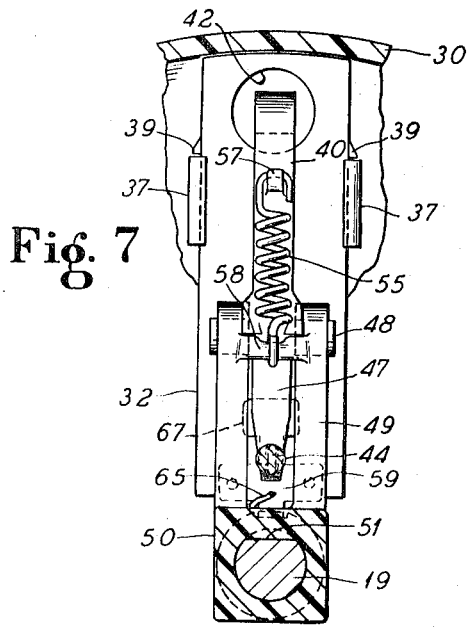
FIG. 7 is a fragmentary sectional elevational detail view taken substantially along the line VII—VII of FIG. 4.

According to an important feature of the invention, means are provided for rewarding proper identification of any one or more of the respective numbers 15. To enhance anticipation, and the pleasure of successful achievement, concealed means are provided for dispensing a reward gift provided that the selector means, i.e., the pointer or hand 18 has been oriented with the proper character or number 15. In a desirable arrangement, a dispensing aperture 25 is provided in association with each of the characters or numerals 15. Conveniently, the associated aperture 25 is located directly behind the numeral 15, in each instance, and the numeral is carried on a respective closure flap 27 which is of a diameter large enough to conceal the aperture and is mounted in normally closing relation to the aperture in a freely hinged relation by suitable hinge means 28 at the top of the aperture. Thereby, the closure flap 27 normally gravitationally assumes a closed relation to its aperture. If desired, biasing spring means may be provided.

Rearwardly from the face panel 13, the housing 11 has a substantial chamber 29 provided by a housing casing shell 30 which may be integral with the panel 13, as by molding the housing from suitable rigid plastic material, although any other material may be employed to meet particular preferences. Concealed within the chamber 29 are reward means for dispensing through a predetermined at least one of the apertures 25. In a simple and efficient arrangement, the reward means comprise one or more containers 31, herein shown as in the form of globes, although any other desirable geometric shape may be employed. The reward containers 31 may be transparent and have therein an attractive object which may serve as a supplementary teaching aid or may be separable and loaded with some sort of gift object which the learner may keep while returning the separable container for refilling and reuse. In any event, preferably a plurality of the reward containers 31 is loaded in a receptacle 32 in the form of a magazine cartridge arranged to support therein a plurality of the reward members 31 and to be mounted within the chamber 29 in dispensing position relative to any predetermined one of the apertures 25. To this end, the receptacle 32 is of elongated tubular form having opposite closed ends and of rectangular, preferably square cross section, receptive therein of a plurality, in this instance three of the reward members 31 urged by biasing means such as a coiled compression spring 33 from one end to the opposite end of the cartridge to present one of the members 31 in alignment with a suitably dimensioned discharge opening 34 in one longitudinal wall of the cartridge and of a size at least as large as the diameter of the reward member and located to be in alignment with an associated one of the apertures 25 when the cartridge is mounted with the face having the opening 34 therein abutting the inner face of the housing face panel 13. To prevent the adjacent reward member from spontaneous ejection through the opening 34, a slight detent boss 35 is provided on the inner roof face of the cartridge adjacent to the opening 34. Mounting of the cartridge 32 is easily effected manually in alignment with any predetermined one of the dispensing apertures 25 by means preferably in the form of snap-in and snap-out latch structure comprising a pair of resilient flexible latching fingers 37 (FIGS. 2, 3, 6 and 7) which may be formed integral with the face panel 13 and project inwardly therefrom, being spaced apart to receive the cartridge 32 therebetween. Latching retention of the cartridge is effected by means of integral latching detent projections 38 on the inner tips of the latching flanges 37 and desirably in the form of rounded ribs which project toward one another to a slightly narrower normal spacing than the width of the cartridge 32. Thereby the cartridge can readily be mounted by orienting it between the latching flanges 37 and pressing the cartridge toward the housing panel 13 until the latching ribs 38 snap into retaining engagement with the back edges of the cartridge. For proper orientation of the discharge opening 34 with the selected dispensing opening 35, the latching flanges 37 are constructed to hold the cartridge 32 in radial alignment with the shaft 19 and with the radially outer end of the cartridge contiguous the wall defined by the housing casing 30, with side lugs 39 on the cartridge 32 cooperating with the radially outermost edges of the latch flanges 37 and with the surrounding casing 30 to maintain the proper radial selected position of the cartridge 32 within the chamber. As best seen in FIG. 6, a respective set of the latching finger flanges 37 is associated with each of the dispensing apertures 25, so that the cartridge 32 can be selectively mounted in an operative relation with any predetermined one of the apertures 25. Further, one or more, up to four additional of the cartridges 32 may be simultaneously mounted in the chamber 29, if desired. In FIG. 6, the maximum plurality positioning of the cartridges 32 has been indicated in full and dash outline. Of course, if a smaller number of the cartridges is employed, various angular positions greater than right angular can be attained, as is evident. Repositioning of any one of the cartridges 32 can be readily effected by pulling it free from the grip of the retaining latch finger flanges 37 and pushing it into position between the latch finger flanges at another predetermined location.

Means are provided for dispensing the reward means member 31 from the cartridge 32 provided that the selector arm member 18 has been oriented with the character, i.e., the number 15, associated with the predetermined aperture 25 with which the cartridge is associated. To this end, thrusting means in the form of a force arm or hammer 40 (FIGS. 4 and 7) are provided including a projecting head end nose 41 positioned to be driven through a suitably dimensioned clearance hole 42 in the back wall of the cartridge 32 in alignment with the discharge opening 34 but of smaller size than the capsule-container 31.

Figure 8:
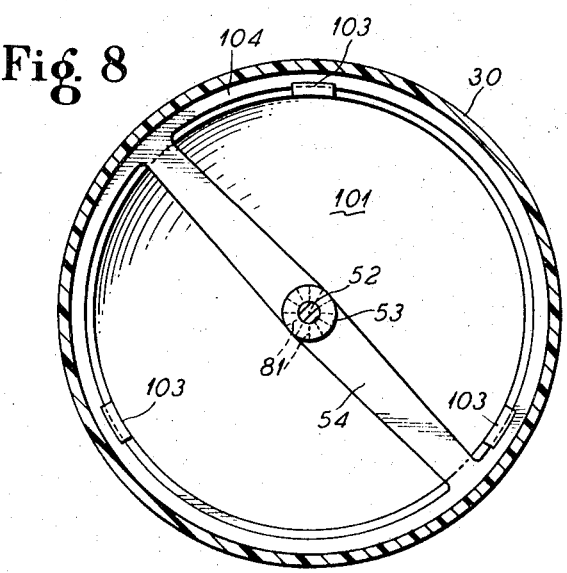
FIG. 8 is a sectional detail view taken substantially along the line VIII—VIII of FIG. 4.

Means for operating the hammer 40 for movement between an inactive retracted position as shown in full outline in FIG. 4 and a capsule driving position as shown in dash outline comprise selectively actuatable means which may be mechanical such as a plunger, but in a relatively simple electrical control system comprise a solenoid 43 having its armature 44 connected as by means of a link 45 to a crank end portion 47 of the arm of the hammer 40 which is intermediately pivotally mounted on a shaft 48 supported on and between distal end portions of a furcated standard 49 between which the crank arm portion 47 is freely swingably disposed. Support for the solenoid 43 is provided by means carried by the shaft 19, desirably in the form of a tubular bar 50 of larger transverse dimensions than the shaft 19 and receiving the shaft in complementary keyed relation therethrough for co-rotation. Keying of the shaft and the supporting bar 50 may be by way of complementary flat interface 51 therebetween. Rearwardly from the bar 50, the shaft has a journal portion 52 extending through and supported by a bearing hub 53 carried concentrically by a spider 54 (FIGS. 4 and 8) which may be formed integrally with and across the open rear end of the shell of the housing casing 30. In a preferred construction, the furcated standard 49 is formed integrally with the bar 50, as shown.

Normally the hammer 40 is maintained in an inactive, retracted position by biasing means such as a coiled tension spring 55 secured at one end to the rear side of the hammer 40 as by hooking an end of the spring over an integral hook-like lug 57 provided for this purpose on the hammer. At its opposite end, the spring 55 is connected under tension to means such as an integral bar 58 provided across the rear side of the distal end portion of the standard 49. Stop means for holding the hammer 40 in biased, retracted position at the ready with the tip of the nose 41 spaced in slight clearance relation to the back of the cartridge 32 are desirably provided by a bar 59 extending across the forward base portion of the standard 49 across the furcation slot therein and engageable by the adjacent distal end of the hammer arm portion 49. Through this arrangement, the hammer 40 is aligned in a radial plane through the axis of the shaft 19 with the pointer hand 18 and is co-rotatably shiftable with the hand 18 into any selected position to which the hand is moved.

Figure 9:
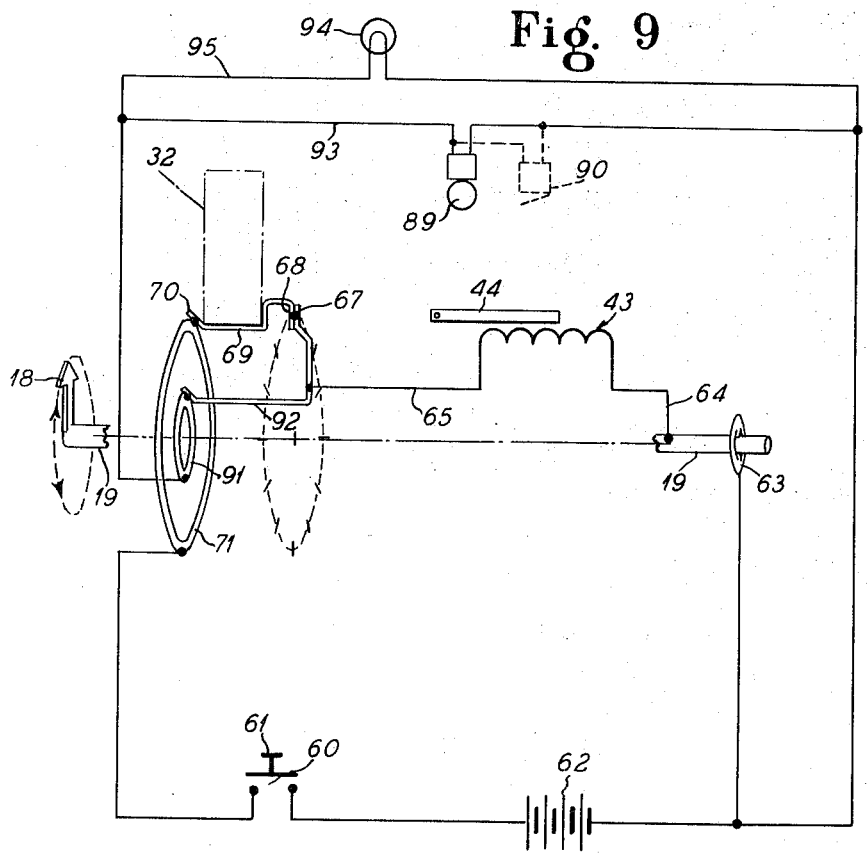
FIG. 9 is a schematic electrical diagram.

Means are provided for selective energizing of the solenoid 43 to drive the hammer 40. For this purpose, an electrical circuit is provided (FIGS. 4, 6 and 9) which includes a normally open switch 60 conveniently mounted within the housing shell 30 to have a switch actuator such as a button 61 exposed at the outside of the housing for manipulation to close the switch. One terminal of the switch 60 is connected in an electrical circuit through one or more batteries 62 and a brush washer 63 with the shaft 19 which for this purpose is metal. A convenient mounting of the brush washer 63 is about the shaft between the hub 53 and the adjacent end of the mounting bar 50 with the brush pads in electrical contact with the shaft in any angular position of the shaft. One end of the coil of the solenoid 43 is electrically connected to the shaft 19 through a lead 64. At its opposite end, the coil 43 is electrically connected through a lead 65 with the bar 59 which may be of electrically conductive metal for this purpose. Extending integrally from the bar 59 is a wiper contact 67 which is positioned to make electrical wiping contact with an electrically conductive wiper contact 68 carried by the back of the cartridge 32 when the hammer 40 is properly aligned with the cartridge for dispensing a capsule therefrom. To complete an electrical circuit through the switch 60, the conductor 69 carried by the cartridge 32 extends to the front of the cartridge and has a terminal pad 70 which makes electrical contact with an electrically conductive commutator ring 71 mounted in the inner face of the panel 13 concentrically about the bearing hub 20 and electrically connected with the opposite terminal of the switch 60 from that which is connected to the battery 62. Thereby, when the wiper contacts 67 and 68 are in engagement, closing of the switch 60 will energize the solenoid 43 and thereby effect driving of the hammer 40 to eject the aligned capsule 31 through the discharge opening 34 and the dispensing aperture 25, with sufficient velocity to flip the associated closure flap 27 open and thereby dispense the reward capsule for successful orientation of the hand pointer 18. If the pointer is not properly oriented with the predetermined aperture 25, nothing will occur when the switch button 61 is pressed either by the learner who has oriented the pointer hand 18, or by the teacher who has asked the learner to identify the character associated with the predetermined dispensing aperture by orienting the pointer hand theretoward.

In order to provide an index for the pointer hand 18 within fairly narrow limits, suitable index mark indicia 72 (FIG. 1) are located on the face 12 adjacent to the respective dispensing apertures 25 and radially aligned with the axis of the shaft 19 in visible relation adjacent to the rim of the associated flap 27 in each instance.

Instead of, or in addition to, the index mark 72, an indexing click mechanism 73 (FIGS. 4 and 5) may be provided on and in association with the rear end of the shaft 19. For this purpose, an axially reciprocable but co-rotative click collar 74 is mounted on a rearward extension 75 of the shaft bearing portion 52 extending clear of the hub 53 to a sufficient extent to accommodate the click collar and biasing means such as a Belleville spring washer 77 maintained under tension against the back end of the collar as by means of a split retaining ring 78 seated in a suitable groove 79 in the shaft extension. Biasing thrust of the spring 77 normally drives the collar 74 to mesh an integral detent tooth 80 on its forward face into one of an annular series of dentiform click recesses 81 in the rear end of the hub 53 and conforming in number and being in alignment with the respective dispensing apertures 25. Any suitable means for keying the collar 74 co-rotatively with the shaft extension 75 may be employed, such as a suitable interface complementary flat surface structure on the shaft extension and the collar. Thereby, as the shaft 19 is turned by manipulation of the hand 18, the click mechanism 73 will effect successive proper aligned orientation of the hand 18 with each of the apertures, providing sensible assurance that proper orientation has been effected. Although the click mechanism may be silent so that it will be evident only by the sense of touch, it may be of the sounding type so that an audible click is heard as each inter-tooth depression is engaged in by the click detent 80. Thereby assurance is had that when the predetermined dispensing aperture has been selected by the learner aligning the hand 18 therewith, full electrical engagement between the wiper contacts 67 and 68 will be present.

As a matter of convenience, the battery or batteries 62 for the electrical circuit may be of the pencil or flashlight type and replaceably mounted within a hollow base 82 for the simulated clock 10. For this purpose, a suitable battery retaining clip 83 may be provided within the hollow base. A removable snap-in closure 84 may be provided across the bottom of the base. In a desirable construction, the hollow base 82 may be constructed separately from the housing shell 30 and secured thereto as by threadedly engaging it on a depending hollow stem 85 along the housing, with a lock washer 87 maintaining the secured relationship wherein a complementary lug and socket 88 maintain the base and housing against relative turning from a preferred assembled relationship.

In order to provide for additional achievement reward for the learner, a signal may accompany successful dispensing of a physical reward by way of one of the capsules 31. To this end, annunciator means such as a sounding device may be mounted within the hollow base 82, such as a bell 89 (FIGS. 4, 6 and 9), or alternatively, a buzzer 90. An electrical connection for operating the sounding device is desirably effected by providing a second, preferably smaller diameter electrically conductive commutator ring 91 (FIGS. 4, 6 and 9) concentric with the shaft 19 and mounted about the inner end of the hub 20 for wiping contact with a terminal extension 92 from the wiper contact 67 or the bar 59 and extending along the dielectric bar 50 in clearance relation to the strip contact 69 carried by the cartridge 32. An electrical circuit is completed between the commutator ring 91 and the sounding device by a lead 93 while the sounding device is connected with the same side of the battery 62 as the commutator ring 63. An electrical circuit is completed only when the wiper contacts 67 and 68 enter into electrical engagement to complete the circuit through the commutator ring 71. Therefore, the sounding device 89 or 90 will operate only when the contacts 67 and 68 are engaged and the switch 60 closed.

Alternatively, or in addition, annunciator means in the form of a visual signal may be provided by way of a lamp 94 (FIGS. 1, 4 and 9) connected by a lead 95 in parallel with the sounding device 89, or alternatively thereto. For maximum effect, the lamp 94 is desirably mounted in a socket 97 carried by an upward hollow projection 98 on the top of the housing shell 30 and provided with a mounting disk 99 on which is threadedly removably secured a transparent or translucent enclosure cap 100 of preferably dome shape to resemble, if preferred, an alarm bell on top of the simulated clock. Thereby, upon success in securing a reward, attention will be attracted by flashing of the lamp 94 and/or sounding of the sounding device 89 or 90. For enabling entry into the chamber 29, but closing the same after such entry, a rear closure cap 101 is desirably provided. This cap may be equipped with means for snapping it into closed position and strain releasing the same. For this purpose, the cap is provided with resilient retaining lug extensions 102 on its perimeter provided with radially outward retaining lips 103 by which the lugs are retainingly engageable with an annular shoulder flange 104 against the outer rear side of which the cap seats. A notch 105 in the perimeter of the cap provides means for inserting an instrument such as a coin to assist in prying the cover 101 free from the shell 30.

In use of the educational toy 10, a cartridge 32 loaded with award capsules 31 is mounted within the chamber 29 of the housing in operative associated with any predetermined one of the dispensing apertures 25, while the rear cover 101 is open. The cover is then closed. The teacher (school teacher, parent, interested older person, etc.) then conveys to the learner the identification indicia or number of the predetermined aperture. The learner then moves the pointer hand into orientation with the number which the learner understands to have been indicated. Thereupon the teacher presses the button 61 to close the switch 60. If the learner has chosen the incorrect identifying character, nothing happens. If the correct number or character has been selected, closing of the switch 60 causes an award capsule to be delivered and the annunciator bell 89 or buzzer 90 and the lamp 94 to be energized, providing the learner with not only an award, but the thrill of general announcement of his success. With any given learner, this may be repeated without reconditioning the device if a plurality of the cartridges 32 have been mounted at predetermined dispensing aperture locations. Other variants in procedure in use of the device will readily suggest themselves to the user.

It will be understood that variations and modifications may be effected without departing from the spirit and scope of the novel concepts of this invention.

I claim as my invention:

1. An educational toy comprising:
   a housing having a plurality of outwardly opening apertures therein with a respective prominent identification means associated with each of said apertures;
   reward means positioned within said housing and dispensable through a predetermined at least one of said apertures;
   a movable selector member identifyingly orientable by moving the selector member into position with respect to any selected one of said identification means;
   means for dispensing said reward means provided that said selector member has been oriented with the identification means associated with said predetermined aperture;
   and respective closure members normally blocking the view into said apertures so that an individual seeking the reward means by orienting the selector member is precluded from visually locating the reward means by looking into the apertures;
   said closure members being displaceably mounted to permit escape of the dispensed reward means.

2. A toy according to claim 1, wherein said housing has a front panel and provides a chamber behind said panel with a rear opening into the chamber, said selector member being located at the front of said panel, said reward means and said dispensing means being located within said chamber and accessible through said rear opening, and a removable closure across said rear opening.

3. A toy according to claim 1, wherein said housing has a simulated clock face form, said apertures are located at the usual hour positions of a clock face, and said members are hinged flaps which have said identification means thereon in the form of numerals corresponding to the respective hour positions.

4. A toy according to claim 3, wherein said selector member comprises a pointer hand having means facilitating digital manipulation to orient the hand with the selected identification means.

5. A toy according to claim 1, having the form of a simulated clock and said housing provided with a face having said apertures at the normal hour positions in said face, said selector member comprising a simulated hour hand, electrically controlled means within said housing for operating said dispensing means, a hollow base supporting said housing in upright position and providing space for electrical energy battery means, and means simulative of an alarm clock bell on the top of said housing providing electrically operated annunciator means correlated in operation with said selector member.

6. A toy according to claim 5, wherein said bell simulating means comprise a translucent shell having an illuminating lamp therein, and annunciator bell means mounted in said hollow base and correlated in operation with said dispensing means.

7. A toy according to claim 1, wherein said housing has a panel with an outer face having said predetermined aperture opening therethrough, said reward means comprising a displaceable reward element and a cartridge containing it provided with a discharge opening for alignment with said predetermined aperture, and means on the inner side of said panel for replaceably supporting the cartridge with said opening aligned with said predetermined aperture.

8. A toy according to claim 7, wherein said award element comprises a capsule, means within the cartridge normally biasing said capsule toward said discharge opening, and means for normally retaining the capsule against escape through said discharge opening until ejected through said opening by said means for dispensing.

9. A toy according to claim 7, wherein said housing panel has all of said apertures therein, said selector member being located at the outer side of said panel, and the inner face of said panel having said means for releasably supporting said cartridge duplicated in alignment with each of the apertures.

10. A toy according to claim 9, said means for releasably supporting the cartridge comprising cartridge retaining devices respectively associated with each of the apertures enabling selective positioning of the cartridge with respect to any predetermined aperture.

11. An educational toy comprising:
a housing having a plurality of outwardly opening apertures therein with a respective prominent identification means associated with each of said apertures;
reward means positioned within said housing and dispensable through a predetermined at least one of said apertures;
selector means identifyingly orientatable with respect to any selected one of said identification means;
means for dispensing said reward means provided that said selector means has been oriented with the identification means associated with said predetermined aperture;
said housing having a panel wherein said apertures are disposed in an annular series about a shaft rotatably mounted through said panel and carrying said selector means in the form of a hand corotatably carried by said shaft at one face of said panel and extending radially relative to the axis of the shaft;
said reward means being positioned at the opposite face of said panel;
and said means for dispensing comprising a device carried corotatably with the shaft.

12. A toy according to claim 11, including means for indexing said shaft and hand relative to said apertures.

13. A toy according to claim 12, said indexing means being located on said one face.

14. A toy according to claim 12, said indexing means including a click mechanism.

15. A toy according to claim 11, said means for dispensing comprising a movable thrusting device normally biased into inactive position, and electrical means for driving said device against its bias including an electrical circuit having a manually operable control switch.

16. A toy according to claim 15, including electrically operative annunciator means controlled by said switch.

17. A toy according to claim 16, wherein said annunciator means comprise a sounding device.

18. A toy according to claim 16, wherein said annunciator means comprise an illuminating device.

19. A toy according to claim 11, including an annunciator device operable coincident with said means for dispensing.

* * * * *